(12) United States Patent
Hieb

(10) Patent No.: US 6,920,186 B2
(45) Date of Patent: Jul. 19, 2005

(54) EXCITER/PHASOR/TRANSMITTER FOR DIRECTIONAL ANTENNA SYSTEM

(76) Inventor: Mario Hieb, 36 H St., #2, Salt Lake City, UT (US) 84103

(*) Notice: Subject to any disclaimer, the term of this patent is extended or adjusted under 35 U.S.C. 154(b) by 776 days.

(21) Appl. No.: 09/990,403

(22) Filed: Nov. 21, 2001

(65) Prior Publication Data

US 2002/0109629 A1 Aug. 15, 2002

Related U.S. Application Data

(63) Continuation-in-part of application No. 09/755,609, filed on Jan. 5, 2001, now abandoned.
(60) Provisional application No. 60/175,071, filed on Jan. 7, 2000.

(51) Int. Cl.$^7$ .............................................. H04L 27/12
(52) U.S. Cl. .................................................... 375/302
(58) Field of Search ................................ 375/302, 316, 375/329, 346, 308; 455/25, 85; 342/367, 359

(56) References Cited

U.S. PATENT DOCUMENTS

| | | | | |
|---|---|---|---|---|
| 5,471,176 A | * | 11/1995 | Henson et al. | 331/1 A |
| 5,666,341 A | * | 9/1997 | Horibe et al. | 369/47.28 |
| 5,793,709 A | * | 8/1998 | Carley | 368/113 |
| 5,796,180 A | * | 8/1998 | Glehr | 340/10.34 |

\* cited by examiner

Primary Examiner—Khai Tran
(74) Attorney, Agent, or Firm—John R. Thompson; Stoel Rives LLP

(57) ABSTRACT

A transmission system delays an analog carrier wave and modulates the analog carrier wave with program audio. The system includes a master oscillator that generates an analog carrier wave. The analog carrier wave is transmitted to a delay stage that delays the analog carrier wave by a certain delay amount. The delay stage may be programmable to adjust the delay amount. The system further receives an analog signal that is representative of programming. A modulator modulates the analog carrier wave with the analog audio and sends the amplitude modulated carrier wave to a power amplifier. After power amplification, the amplitude modulated carrier wave is broadcast by a conventional antenna.

18 Claims, 9 Drawing Sheets

Simple Directional AM System

US 6,920,186 B2

EXCITER/PHASOR/TRANSMITTER FOR DIRECTIONAL ANTENNA SYSTEM

RELATED APPLICATIONS

The present application is a continuation in-part of and claims priority to U.S. patent application Ser. No. 60/175,071, entitled "Directional Antenna System and Digital Exciter/Phasor/Transmitter," filed Jan. 7, 2000, and U.S. patent application Ser. No. 09/755,609 entitled "Digital Exciter/Phasor/Transmitter for Directional Antenna System," filed Jan. 5, 2001, now abandoned both of which are hereby incorporated by reference.

BACKGROUND OF THE INVENTION

1. The Field of the Invention

The present invention is related to radio transmission equipment, and more specifically to directional antenna systems featuring phase shifting.

2. Technical Background

AM and FM radio broadcasts are extremely popular for their transmission of audio programs. AM and FM radio has been employed for several decades and can be found world wide. Radio receivers have numerous embodiments including various portable receivers to be manually carried as well as being incorporated into vehicles. AM radio has a disadvantage in that it does not provide high fidelity as does FM radio. As such, AM radio has not enjoyed quite the popularity that FM radio has for musical broadcasts. AM radio is nevertheless widely used for talk show and news broadcasts.

In general, FM radio stations are valued more than AM radio stations because of the improved sound quality. Accordingly, popular music stations prefer to broadcast on FM frequencies and the AM frequency band is generally viewed as being inferior to the FM band.

Nevertheless, AM systems have advantages that are not found with FM systems. For example, AM signals can propagate further than FM signals. Directional AM systems also allow for directed power and different day and night time power levels and directional patterns to reduce interference. AM frequencies are also more available and less expensive than FM frequencies.

Conventional AM directional array systems include phase shifter components that employ a process of envelope delay and power division to create a desired directional pattern. Phase shifting components are typically reactive and are collectively referenced herein as a phasor. The phasor includes inductive and capacitive components to create the envelope delay and power ratio relative to a reference tower. The reactive components change the phase, relative to a reference tower, of the output signal flowing to one or more broadcast towers and thereby create the envelope delay. The reactive components also introduce distortions in the envelope. The reactive components of the phasor further divide the transmitter output power into proper ratios that are delivered to the towers.

Phasors have many limitations that make them difficult and expensive to use. The reactive components of the phasor are typically large and require mechanical systems that are difficult to adjust and configure. Phasors also are subject to drift caused by the environment, create signal distortions, and are maintenance intensive. Furthermore, as the power output and the number of towers in a directional array increases, the cost of a phasor increases exponentially. Phasors are relatively expensive to operate at high power and modulation levels, multiple power levels, and with multiple tower configurations. In numerous instances large, high power directional arrays are required to adequately serve the community. Phasors are typically custom built, adding to their expense.

An ideal phasor presents a load to the transmitter that has the same impedance at all side band frequencies. However, conventional phasors are comprised of inductors and capacitors, whose reactance varies with frequency. Thus, ideal conditions are difficult to achieve with a conventional phasor.

For proposed digital communication techniques, digital modulation envelopes are required. However, digital modulation envelopes may be affected by distortions caused by the reactive components within a phasor. Digital modulation systems typically require that a load be linear across the width of the band. Phasors, with their inherent instability, make achieving true load linearity difficult. Furthermore, phasors create envelope delays at high signal levels which are outside the digital domain. This precludes the use of digital components that may overcome the limitations of the reactive components.

It would be an advancement in the art to improve AM transmission systems by eliminating the need for expensive and difficult reactive components and create a phasor that is mass-producible. It would be a further advancement in the art to create the envelope delay necessary for directional operation at a low signal level within the digital domain and control the power delivered to each tower at the power amplifier stage. Such advancements would improve the operation of AM transmission systems and help increase the commercial viability of AM stations.

BRIEF SUMMARY OF THE INVENTION

The system and method of the present invention relates to an improved radio frequency transmission system that generates a broadcast signal with an envelope delay and virtual power divider to produce a desired directional pattern. In one embodiment, the system delays a carrier wave and program audio in the digital domain. The carrier wave and the program audio may then be modulated as analog signals.

The system includes a master oscillator that generates a digital carrier wave. The digital carrier wave is transmitted to a delay stage that delays the digital carrier wave by a certain delay value. The system further receives an analog signal, such as analog audio, that is representative of programming. The analog signal is transmitted to an analog-to-digital converter where it is converted to digital audio. The digital audio is then transmitted to a delay stage that delays the digital audio by the same delay value.

The digital carrier wave and the digital audio may then be transmitted to digital-to analog converters and converted to an analog carrier wave and analog audio respectively. The system may further include a modulator for amplitude modulating the analog carrier wave with the analog audio. The amplitude modulated carrier wave is next sent to a power amplifier and transmitted by a conventional antenna.

The present invention eliminates the need for reactive components for creating the envelope delay. The present invention provides phase shifting of a carrier wave and program audio within the digital domain. The system described herein avoids the limitations of reactive components and improves the operation of AM transmission systems. By eliminating the reactive components and operating at least in part in the digital domain the system provides automatic and more precise tuning, requires less space, and is less expensive. The system is further mass producible, provides less distortion, is less susceptible to lightning, has fewer mechanical parts, is adjustable remotely, has less tuning interaction, and the components are not power dependant.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

A preferred embodiment of the invention is now described with reference to the FIGS. 1–9, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
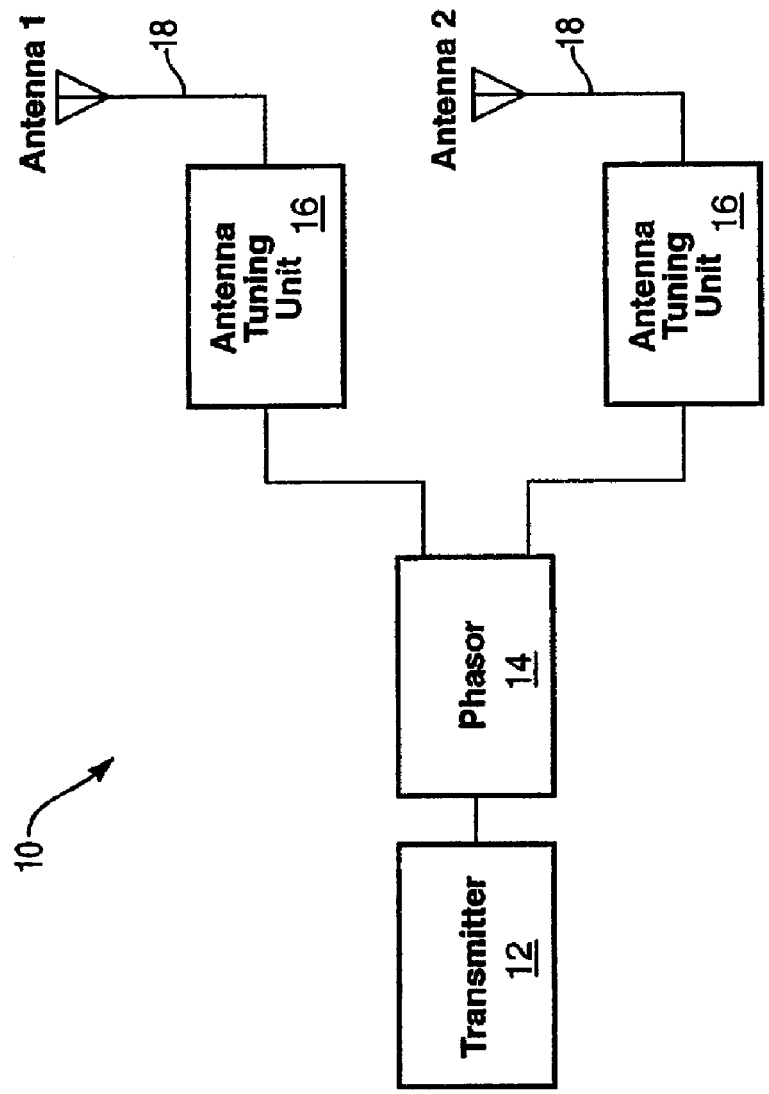
FIG. 1 is a schematic block diagram of a simple directional AM system.

Present directional AM broadcast systems employ a system of power division and envelope delay to create the desired directional pattern. FIG. 1 illustrates a block diagram of a simple directional AM system 10 that may be mounted on a reference tower. The system 10 includes a transmitter 12 that may be comprised of a number of additional sub-components. The transmitter 12 couples to a phasor 14 that is used to create an envelope delay relative to an incoming current to the reference tower. The phasor 14 further divides the power of the current into proper ratios.

The conventional phasor 14 includes inductive and capacitive components that create the envelope delay and the power divider. Envelope delay is created by utilizing reactive components to change the phase, relative to the reference tower, of the current flowing to one or more antennas. The inductive and capacitive components have disadvantages in that their reactance varies with frequency thereby preventing ideal conditions. This makes phasors 14 difficult to adjust, maintenance intensive, and subject to drift.

The phasor 14 couples to one or more antenna tuning units 16, with two antennas tuning units 16 being shown in FIG. 1. An antenna tuning unit 16 matches the combined impedance of the transmission line to the impedance of an antenna 18. The antenna tuning unit 16 further couples to the antenna 18 which may be a conventional antenna, such as an AM antenna.

Figure 2:
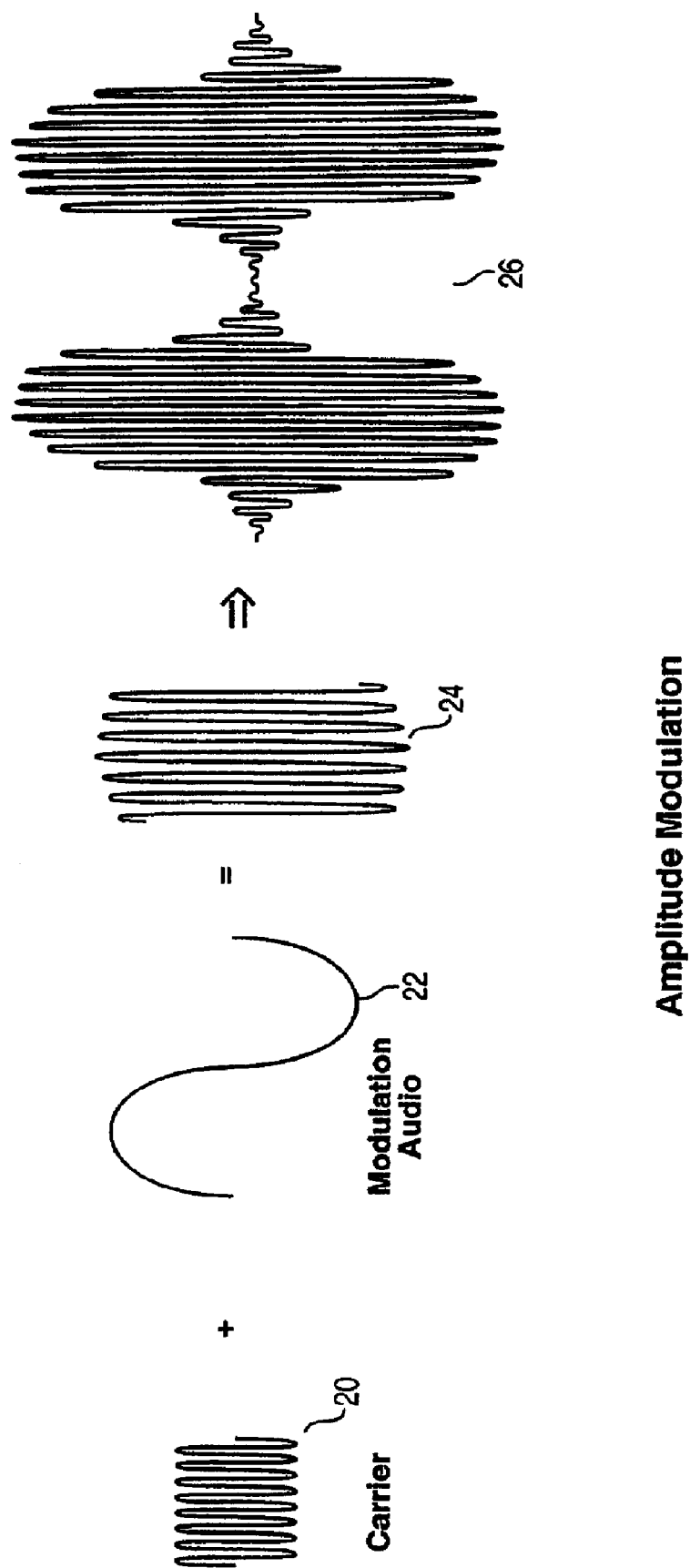
FIG. 2 is a graph of amplitude modulation.

Referring to FIG. 2, an illustration of an envelope delay that is created by the phasor 14 is shown. The transmitter 12 modulates the radio-frequency carrier wave 20 with modulation audio 22 to transmit the audio signals. The phasor 14 receives the amplitude modulated wave 24 from the transmitter 12 and creates an amplitude modulated wave 24 with an envelope delay 26.

Figure 3:
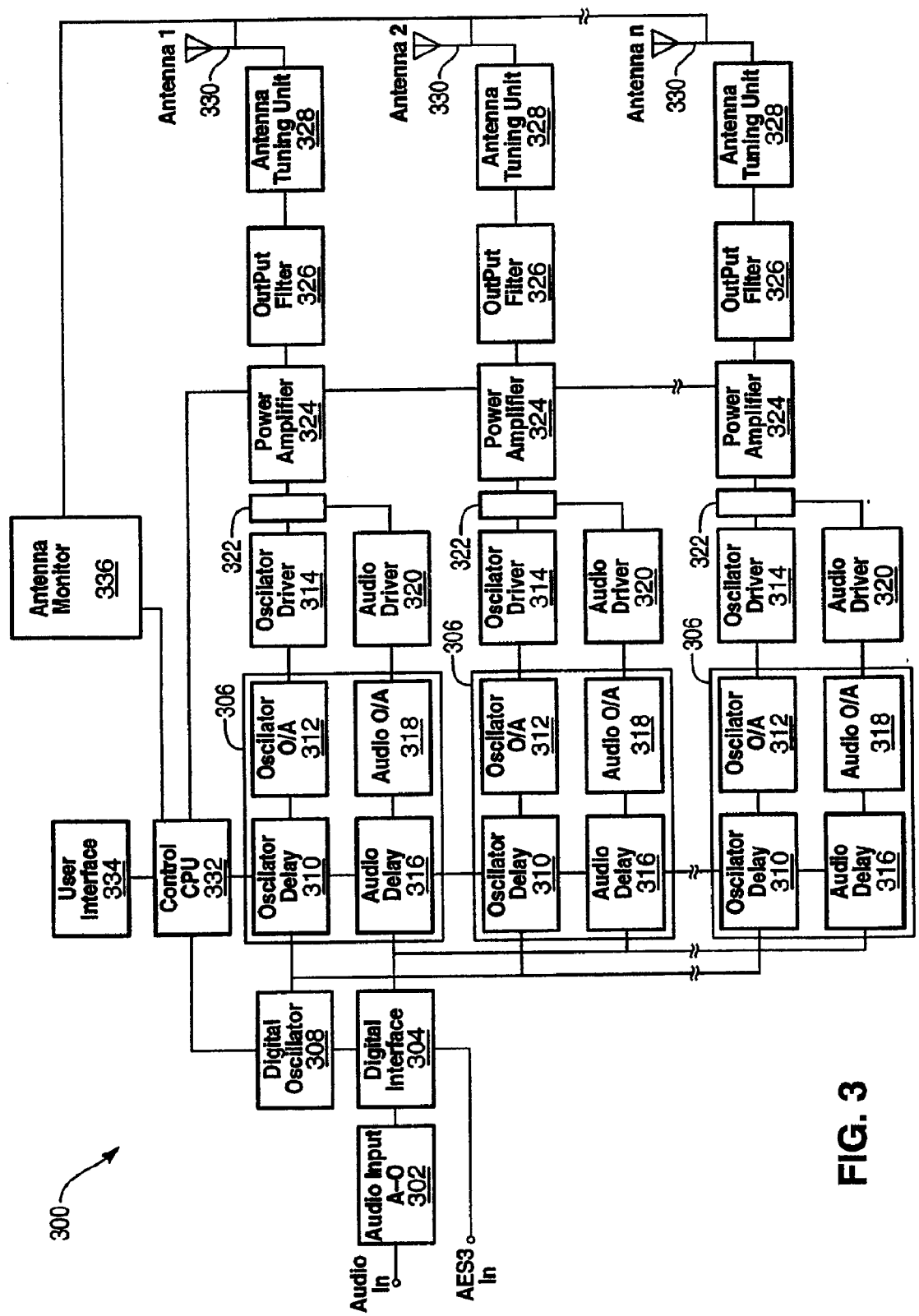
FIG. 3 is a schematic block diagram of one possible embodiment of the present invention.

Referring to FIG. 3, one embodiment of a transmission system 300 of the present invention is shown that operates as an exciter/phasor/transmitter. The system 300 may include one or more transmission lines and antennas for broadcasting on one or more towers. The transmission lines and antennas are referenced herein as 1 to N to indicate a variance in the number of transmitters and antennas. An improvement to the aforementioned method of envelope delay is to create the envelope delay at a lower signal level in the digital domain prior to power amplification. Although the invention has particular application to amplitude modulation one of skill in the art will appreciate that the invention is not limited to amplitude modulation or to the AM broadcast band. Indeed, the concepts disclosed herein relating to low-signal and digital domain envelope delay and virtual power division are applicable to other modulation modes and broadcast bands. Components of the system 300 are now described.

The system 300 includes an audio input/analog-to-digital (A/D) converter 302. The audio input/(A/D) converter 302 receives inputted program audio, buffers the program audio, and converts the program audio from analog to digital.

The system 300 further includes a digital interface 304 that receives the digital program audio. The digital interface 304 may further receive an AES3 input. The digital interface 304 chooses between the AES3 input and the digitized program audio. The chosen input is passed from the digital interface 304 to a delay stage 306.

The delay stage 306 consists of various components to create a delay in the digital domain and at a low signal level. This is achieved by delaying a carrier wave and the inputted program audio. The system 300 includes a master oscillator 308 that generates a carrier wave in the digital domain. The master oscillator 308 couples to the delay stage 306 and, more specifically, to an oscillator delay 310 within the delay stage 306. The oscillator delay 310 receives and delays the carrier wave by a certain delay value. The carrier wave may be delayed up to 360 degrees. The delay is adjustable as desired to accomplish the desired directional pattern of the broadcast. The delay stage 306 further includes an oscillator digital-to-analog (D/A) converter 312 that receives the delayed carrier wave and converts it to an analog signal.

The system 300 may further include an oscillator driver 314 that receives the delayed carrier wave. The oscillator driver 314 may perform additional functions to the carrier wave such as filtering, aliasing, and amplifying the carrier wave to a level sufficient to drive the modulation stage.

The delay stage 306 may further include an audio delay 316 that delays the inputted program audio in the digital domain based on a delay value. The audio delay 316 may delay the program audio up to 360 degrees. The delay value is adjustable and is identical to the delay value in the oscillator delay 310. Thus, the oscillator delay 310 and the audio delay 316 are in communication with one another to ensure that the delay is identical.

The delay stage 306 may further include an audio digital-to-analog (D/A) converter 318 that receives the delayed program audio and converts the audio to analog. The program audio is then passed to an audio driver 320 that filters the audio for aliasing and amplifies the audio to a level sufficient to drive a modulator stage.

The program audio and the carrier wave are both transmitted to a modulator 322 that modulates the carrier wave with the amplitude characteristics of the program audio. The amplitude modulated carrier wave 24 includes the delay that was created at the delay stage 306. In this manner, the carrier wave and the program audio are delayed in the digital domain, converted to analog, and then modulated as analog signals.

The envelope delay may be calculated using the following parameters and terms:

oscillator frequency=f (Hz);

period of one cycle=T (sec);

speed of light=$C=2.997925 \times 10^7$ m/sec;

wavelength, $\lambda$ (meters); and phase of current, $\psi$ (degrees).

The following equations define their relationships:

$$\lambda = C/f;$$

$$T = 1/f; \text{ and}$$

$$T_1 = \text{one degree of phase in seconds} = T/360.$$

In one example, the oscillator frequency, f, may be 540 kHz. This would provide a wavelength and period as shown:

$$\lambda = C/f = 2.997925 \times 10^7 \text{ m/s divided by } 540{,}000 \text{ c/s} = 55.5171 \text{ m};$$

$$T = 1/f = 1 \text{ divided by } 540 \times 10^6 \text{ c/s} = 1.8519 \times 10^{-6} \text{ s/c; and}$$

$$T_1 = \text{one degree of phase in seconds} = T/360 = 1.8519 \times 10^{-6} \text{ divided by } 360 =$$

$$5.144 \times 10^{-9} \text{ s/degree}.$$

The general equation for calculating time-delay per degree of phase is $T_{\psi 1} = 1/360\,f$. Where $T_{\psi 1}$=one degree of phase in seconds and f=carrier frequency.

The amplitude modulated carrier wave 24 is transmitted to the power amplifier 324. The power amplifier 324 amplifies the modulated carrier wave 24 to a sufficient strength for broadcast. The power amplifier 324 may be a conventional solid-state power amplifier. The power amplifier 324 may be varied continuously as desired to create virtual power division. The modulated carrier wave 24 is then transmitted to an output filter 326 that provides buffering and filtering to improve the quality of the modulated carrier wave 24. The modulated carrier wave 24 is next transmitted to an antenna tuning unit 328 that matches the impedance of the transmission line to the impedance of an antenna 330.

The system 300 may further include a control central processing unit (CPU) 332 that is in electrical communication with certain components of the system 300 to control the parameters of various stages. The CPU 332 may be coupled to the master oscillator 308 to vary characteristics of the carrier wave. The CPU 332 may further be in communication with the oscillator delay 310 and audio delay 316 to control the phase delay. The CPU 332 may also be in communication with the power amplifier 324 to control the power output. In this manner, precise control of the transmitter power output and phase is controlled.

The CPU 332 may further be in electrical communication with a user interface 334. The user interface 334 enables input/output of data to and from the CPU 332. The user interface 334 may include a keyboard, mouse, monitor, and so forth as is known in the art. The user may enter desired power characteristics and delay values which are then implemented by the CPU 332.

The system 300 may further include other components such as an antenna monitor 336 to allow for feedback for automatic adjustment or out-of-tolerance notification. The antenna monitor 336 may provide the feedback to the CPU 332. The CPU 332 may respond to the feedback automatically without user intervention or it may notify the user. The CPU 332 may respond to feedback by adjusting envelop delay 26 and power ratios to meet phase and ratio target parameters.

The components of the system 300 and the examples shown herein are for illustrative purposes and should not be deemed limiting of the scope of the invention. Certain components have been defined with reference to their functionality, but one of skill in the art will appreciate that certain components may be further distributed or associated in a different manner. For example, the delay stage 306 contains the components for delaying and converting from digital to analog. The oscillator D/A converter 312 and the audio D/A converter 318 may be separately identified from the delay stage 306 and referred to as a D/A conversion phase.

As the carrier wave and the program audio exists in certain stages in the digital domain, a digital signal processor (DSP) may be employed to perform certain functions of the present invention. The DSP may also be used to provide additional features for the system.

Figure 4:
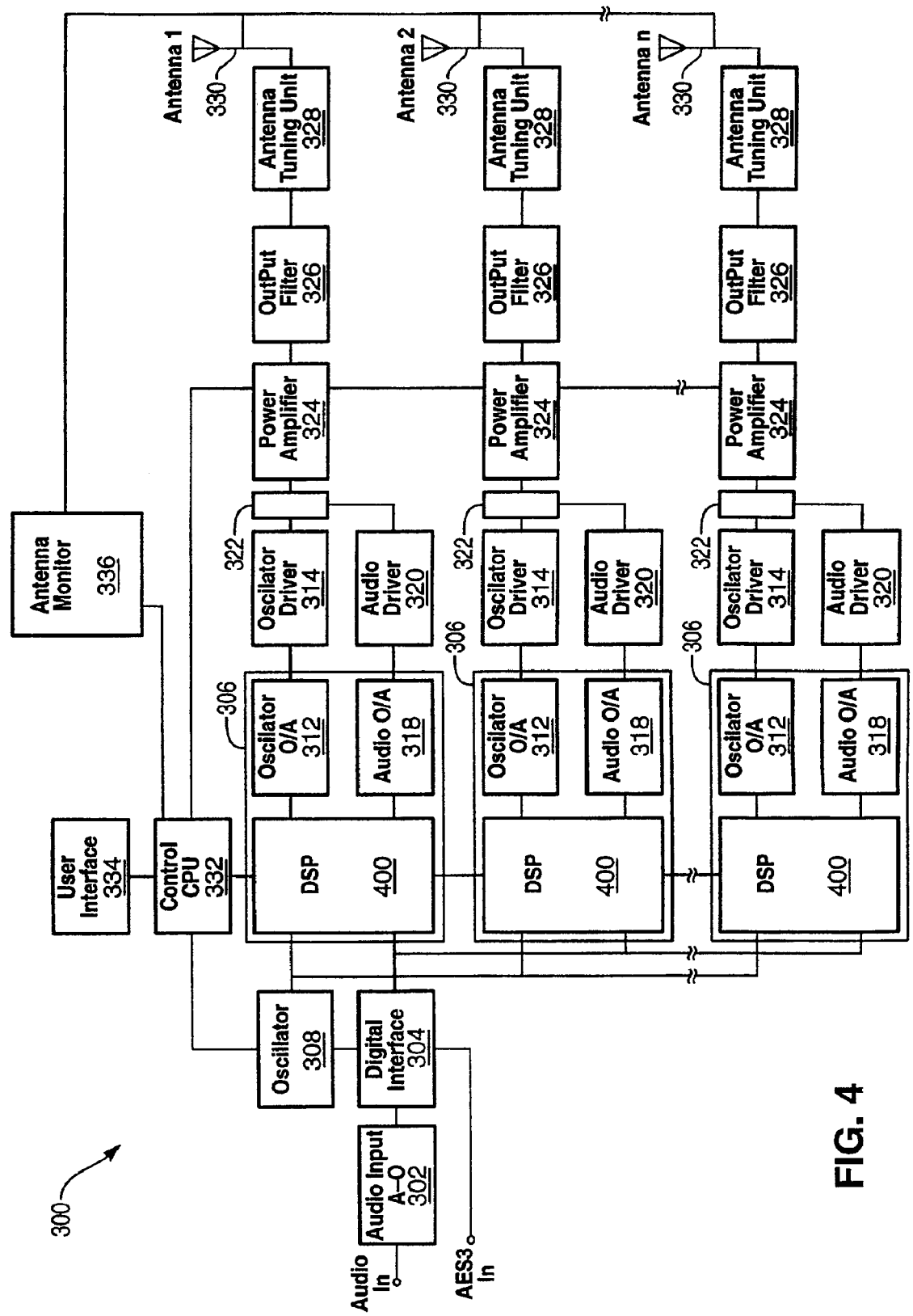
FIG. 4 is a schematic block diagram of an alternative embodiment of the present invention.

Referring to FIG. 4, an alternative embodiment of the present invention is shown wherein a DSP 400 is substituted for the oscillator delay 310 and the audio delay 316. As a DSP 400 is a highly versatile component, it may be encoded to perform the phase delay functions for both the carrier wave and the program audio. The DSP 400 may perform the same functionality as described above.

Figure 5:
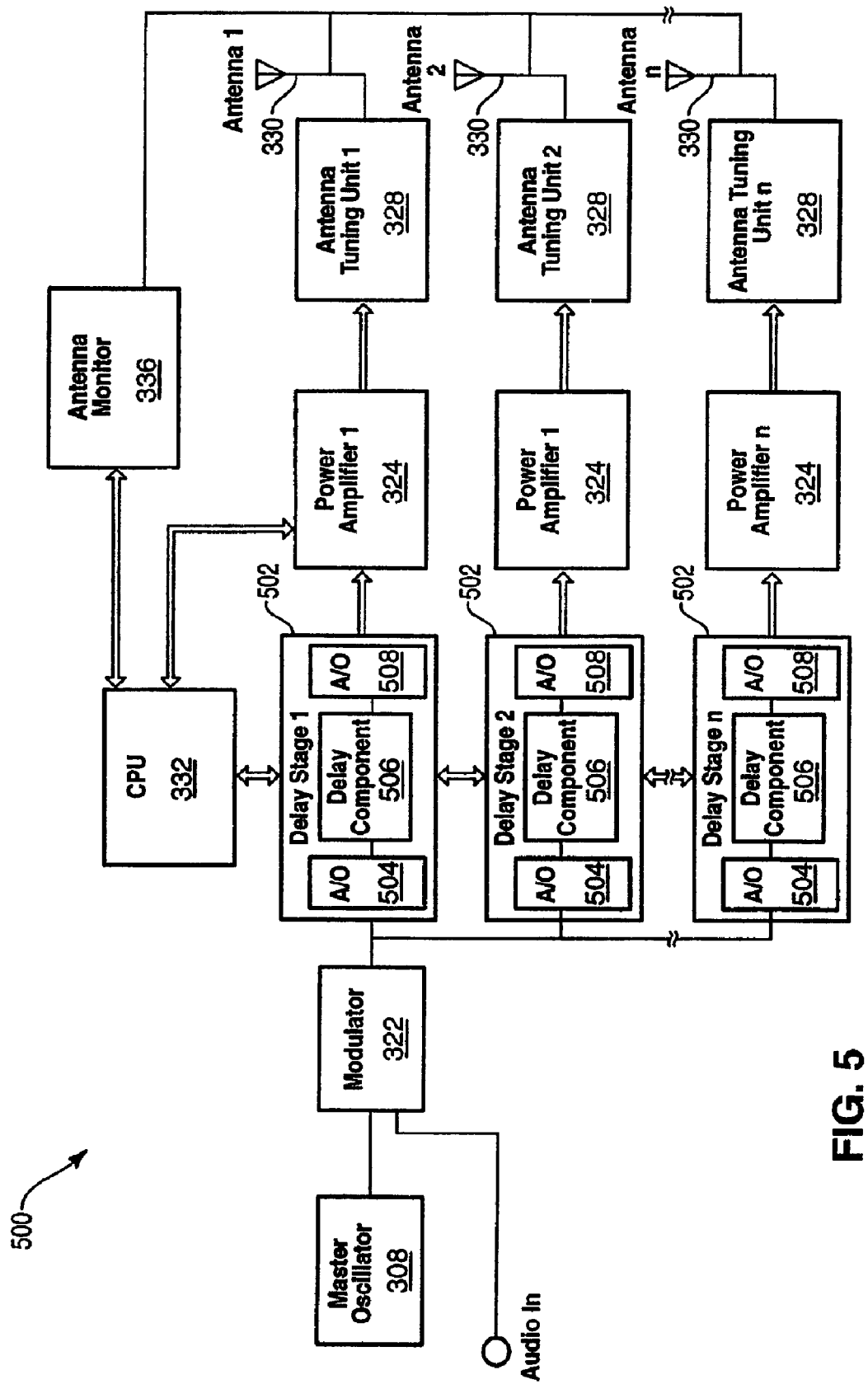
FIG. 5 is a schematic block diagram of an alternative embodiment of the present invention.

Referring to FIG. 5, an alternative embodiment of the present invention is shown wherein the system 500 generates the envelope delay after modulation and prior to power amplification. In such an embodiment, the program audio is received as an analog signal and transmitted to a modulator 322. The master oscillator 308 generates and transmits an analog carrier wave to the modulator 322. The modulator 322 modulates the carrier wave based on amplitude characteristics of the program audio.

The amplitude modulated carrier wave is then transmitted to a delay stage 502. The delay stage 502 may include an A/D converter 504 to convert the amplitude modulated carrier wave to a digital signal. The amplitude modulated carrier wave is then transmitted to a delay component 506 that creates an envelope delay in the digital domain. As in the previous embodiment, the envelope delay is based on a delay value. The delay component 506 may be a DSP configured to create the envelope delay.

The delay component 506 is in electrical communication with the CPU 332 to enable control of the delay value. After creation of the envelope delay, the amplitude modulated carrier wave is transmitted to a D/A converter 508 for conversion to an analog signal. The amplitude modulated carrier wave may then be transmitted to a power amplifier 324 for amplification. The power amplifier 324 may be in electrical communication with the CPU 332 to allow for power adjustment. Other components shown in the system 500 may operate as discussed in the previous embodiment.

Figure 6:
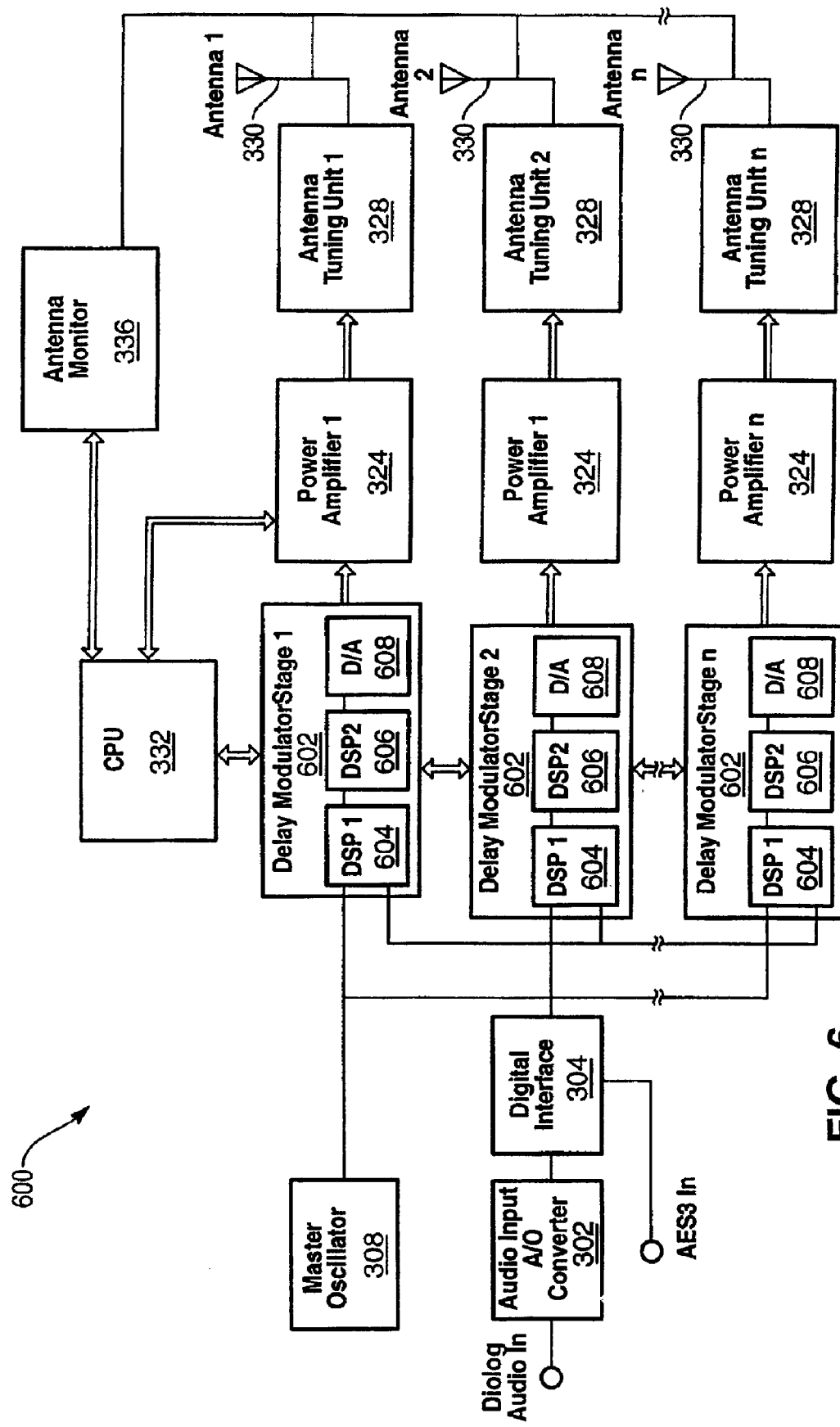
FIG. 6 is a schematic block diagram of an alternative embodiment of the present invention.

Referring to FIG. 6, an alternative embodiment of the present invention is shown wherein modulation and envelope delay both occur in the same stage. The program audio may pass through an audio input A/D converter 302 and digital interface 304 as discussed in the embodiment of FIG. 3. This provides a digital program audio to a delay/modulation stage 602. A master oscillator 308 operates to generate a digital carrier wave that is also transmitted to the delay/modulation stage 602. The delay/modulation stage 602 generates a delay in the carrier wave and in the program audio by a certain delay value. The delay/modulation stage 602 may include a first DSP 604 configured to provide the delay in the received carrier wave and the program audio. The DSP 604 may be in communication with the CPU 332 to receive a delay value.

The delayed carrier wave and delayed program audio may be transmitted to a second DSP 606 that is in communication with the first DSP 604. The second DSP 606 is configured to combine the carrier wave and the program audio to generate an amplitude modulated carrier wave. The amplitude modulated carrier wave may then be transmitted to a D/A converter 608 where it is converted to an analog signal. Operation of the other components of the system 600 may be as discussed in previous embodiments.

Figure 7:
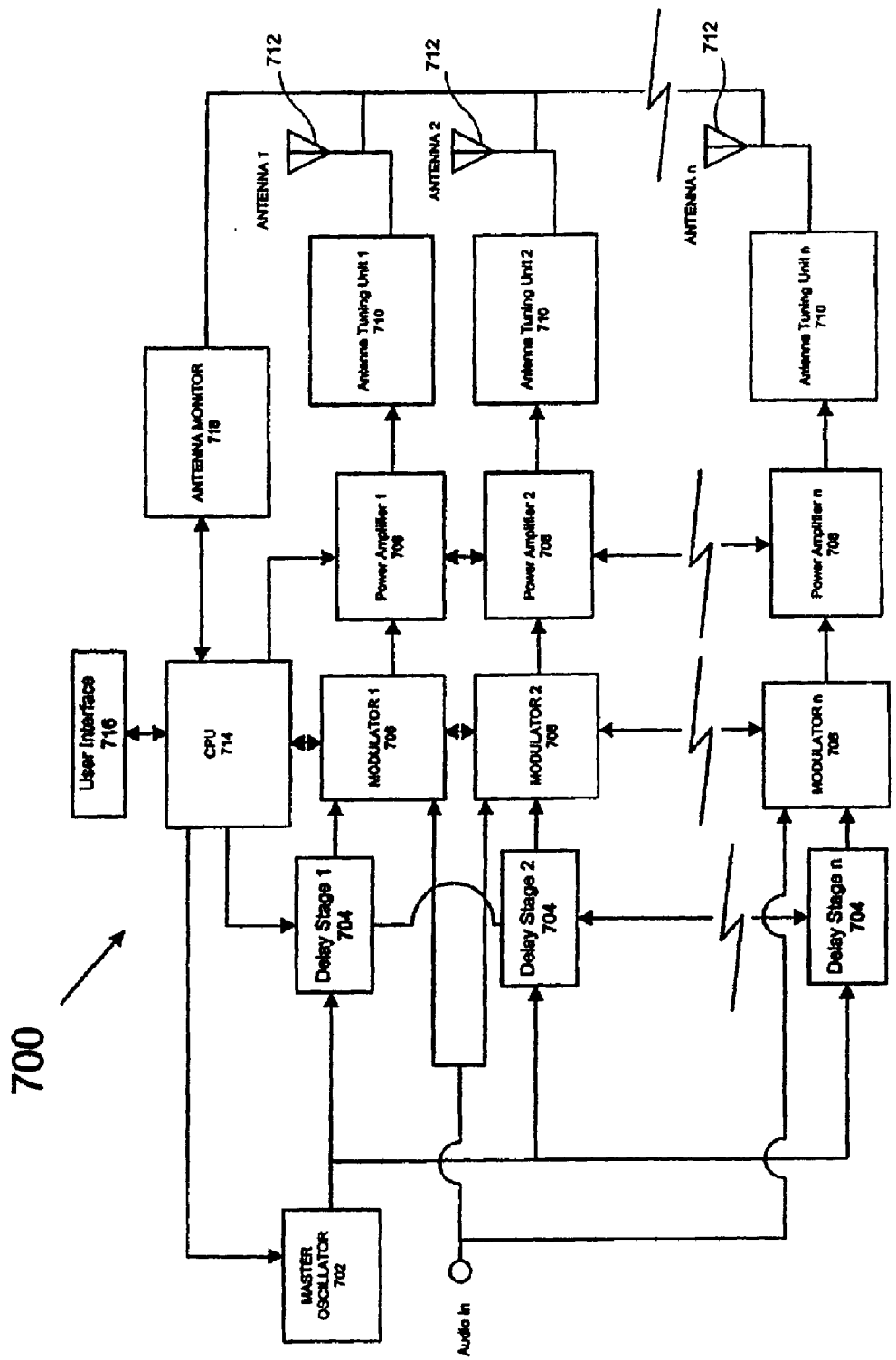
FIG. 7 is a schematic block diagram of an alternative embodiment of the present invention.

Referring to FIG. 7, an alternative embodiment of a transmission system 700 of the present invention is shown. The system 700 may include one or more transmission lines and antennas for broadcasting on one or more towers. The system 700 differs from previous embodiments in that the delay is created in the analog domain. Thus, the system does not convert between analog and digital signals.

The system 700 includes a master oscillator 702 that generates an analog carrier wave. The master oscillator 702 couples to one or more delay stages 704 which delays the carrier wave. The delay stage 704 includes various components to delay analog signal. In one embodiment, the delay stage 704 may include reactive components to achieve a predetermined delay. The delay stage 704 may be configured to provide a delay that would not be adjustable. The delay stage 704 may also include components that are manually adjusted through the use of toggle or dip switches to provide a desired delay.

Alternatively, the delay stage 704 may be programmable to provide a delay to accomplish the desired directional pattern of the broadcast. The delay stage 704 may be electronically controlled by a processor or user to adjust the delay.

The delayed carrier wave is then sent to a modulator 706. The modulator 706 further receives analog program audio. The modulator 706 modulates the carrier wave with the amplitude characteristics of the program audio. The amplitude modulated carrier wave includes the delay that was created at the delay stage 704.

The amplitude modulated carrier wave is transmitted to a power amplifier 708. The power amplifier 708 amplifies the modulated carrier wave to a sufficient strength for broadcast. The modulated carrier wave may further be buffered and filtered to improve the quality of the modulated carrier wave. The modulated carrier wave is next transmitted to an antenna tuning unit 710 that matches the impedance of the transmission line to the impedance of an antenna 712.

The system 700 may further include a CPU 714 that is couples with certain components of the system 700 to control the parameters of various stages. The CPU 714 may be coupled to the master oscillator 702 to vary characteristics of the carrier wave. The CPU 714 may further be in communication with the delay stage 704 to control the phase delay. The CPU 714 may also be in communication with the power amplifier 708 to control the power output. In this manner, a user may control transmitter power output and phase.

The CPU 714 may further be in electrical communication with a user interface 716. The user interface 716 enables input/output of data to and from the CPU 714. The user interface 716 may include a keyboard, mouse, monitor, and so forth as is known in the art. The user may enter desired power characteristics and delay values which are then implemented by the CPU 714.

The system 700 may further include other components such as an antenna monitor 718 to allow for feedback for automatic adjustment or out-of-tolerance notification. The antenna monitor 718 may provide the feedback to the CPU 714. The CPU 714 may respond to the feedback automatically without user intervention. The CPU 714 may respond to feedback by adjusting envelop delay and power ratios to meet phase and ratio target parameters.

The system 700 may further include additional components that are well known in the art. For example, the system may include an oscillator driver (not shown) that receives the delayed carrier wave and filters and amplifies the carrier wave to a level sufficient to drive the modulator 706.

Figure 8:
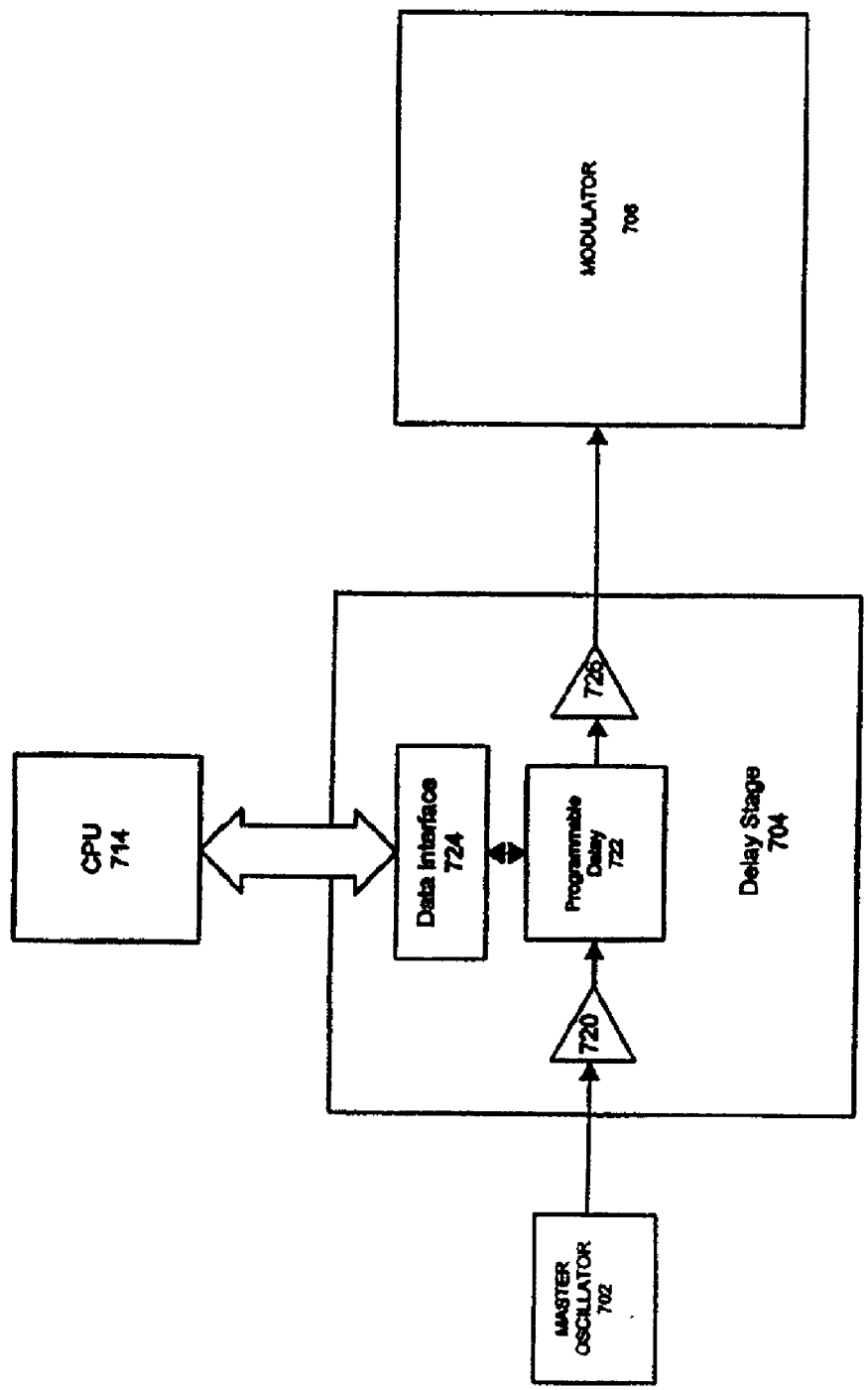
FIG. 8 is a block diagram illustrating one embodiment of a delay stage of the present invention.

Referring to FIG. 8, a block diagram illustrating an expanded view of one embodiment of the delay stage 704 is shown. The carrier wave from the master oscillator 702 drives an input buffer amp 720 of the delay stage 704. The input buffer amp 720 couples to and drives a programmable delay chip 722. The programmable delay chip 722 is coupled to a data interface 724 that may include a data bus. The data interface 724 further couples with the CPU 714 to enable selection of the delay. Alternatively, the programmable delay chip 722 may be manually adjusted through toggle or dip switches as previously stated. The delayed carrier wave is then sent to an output buffer amp 726 and passed to the modulator 706.

Figure 9:
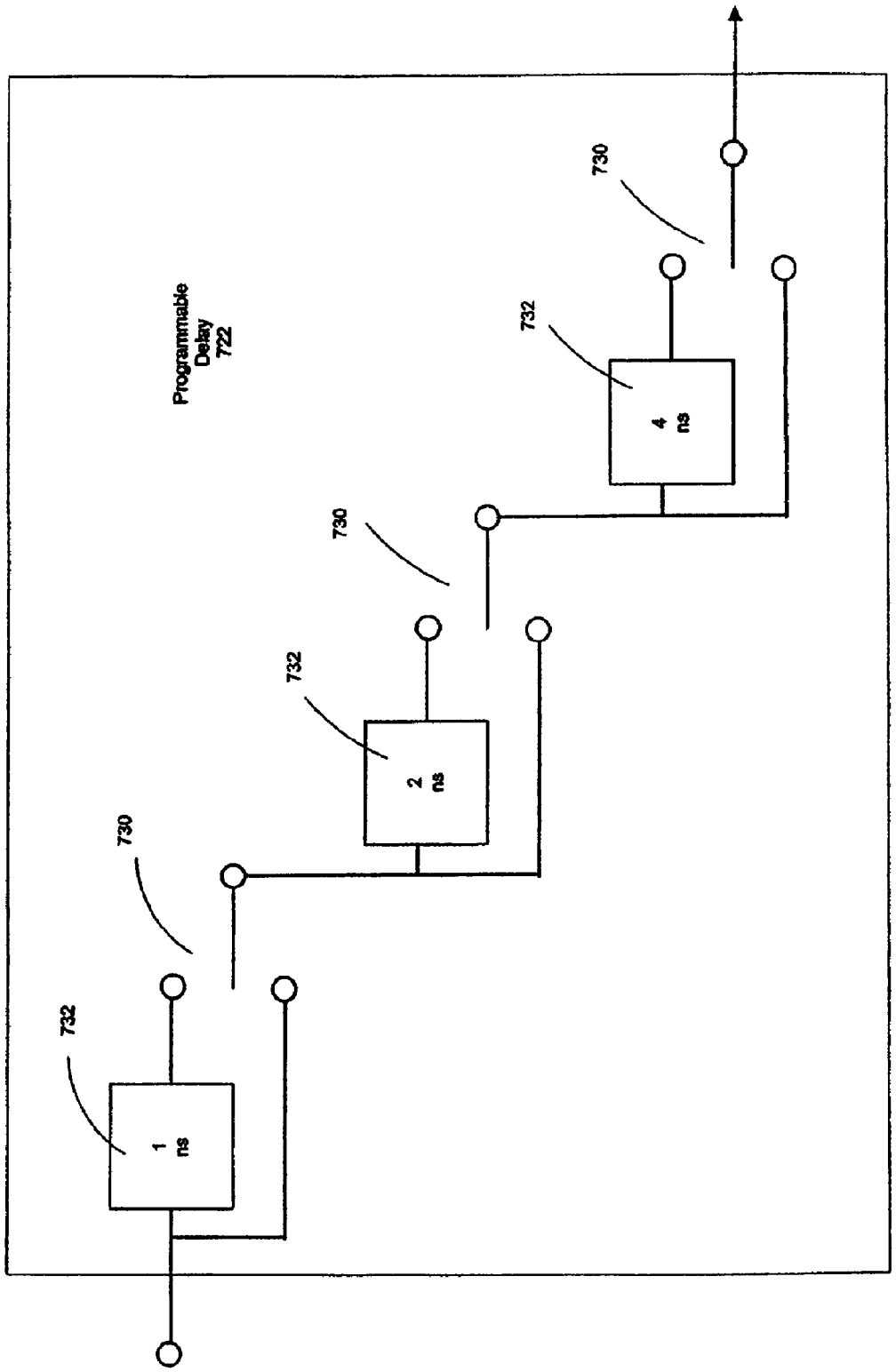
FIG. 9 is a schematic diagram of one embodiment of a programmable delay of the present invention.

Referring to FIG. 9, a circuit diagram illustrating a conceptual view of the programmable delay 722 is shown. The programmable delay 722 may include a series of switches 730 or components configured to operate as switches. The programmable delay 722 may further include one or more delay components 732. Each delay component 732 may be configured with a preestablished delay value such as in nanoseconds. Operation of each switch 730 determines whether the carrier wave will pass through a delay component 732 associated with an adjacent switch 730. Through various combinations of switch configurations, an overall delay amount for the carrier wave may be established. Table 1 illustrates the resulting delay amount based on switch configurations.

TABLE 1

| Switch 1 | Switch 2 | Switch 3 | Delay Amount |
|---|---|---|---|
| 0 | 0 | 0 | 0 ns |
| 0 | 0 | 1 | 1 ns |
| 0 | 1 | 0 | 2 ns |
| 0 | 1 | 1 | 3 ns |
| 1 | 0 | 0 | 4 ns |
| 1 | 0 | 1 | 5 ns |
| 1 | 1 | 0 | 6 ns |
| 1 | 1 | 1 | 7 ns |

One of skill in the art will appreciate that the embodiment of FIG. 9 is for exemplary purposes. The number of switches 730, delay components 732, and delay values may vary as needed and should not be considered limiting of the invention. The programmable delay 722 may be in communication with the CPU 714, another form of controller, or user to enable programmable adjustment. Alternatively, the switches 730 may be manually operated by a user to achieve the desired delay amount.

The present invention provides a transmission system for broadcasting desired directional patterns. The transmission systems described herein provide phase shifting of a modulated carrier wave with program audio within the digital and analog domains. Delay in the digital domain has the advantage of less signal distortion and noise, and avoids other limitations of reactive components. In one method, delay may be achieved with a DSP. A digital oscillator may be internal to the system and an external oscillator would not be required. Digital delay further requires less calibration and is easier to initialize. Given the popularity and public acceptance of digital products, digital delay may have marketing advantages as well. Delay in the analog domain may be less expensive as simple reactive components may be used in the delay stage. The delay stage may include components which are purchased off-the-shelf and simple to configure to a desired delay.

Although the invention has particular application to amplitude modulation one of skill in the art will appreciate that the invention is not limited to amplitude modulation or to the AM broadcast band. Indeed, the concepts disclosed herein are applicable to other modulation modes and broadcast bands.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A radio frequency transmission system incorporating an envelope delay within a broadcast signal to achieve a directional pattern, the system comprising:

an oscillator configured to provide a carrier wave;

a delay stage in electrical communication with the oscillator to receive the carrier wave, the delay stage configured to delay the carrier wave by a delay amount; and a modulator in electrical communication with the delay stage to receive the carrier wave, the modulator further receiving analog audio and configured to provide amplitude modulation of the carrier wave with the analog audio to thereby generate an amplitude modulated carrier wave with an envelop delay.

2. The radio frequency transmission system of claim 1 further comprising, an amplifier in electrical communication with the modulator and configured to amplify the power of the amplitude modulated carrier wave.

3. The radio frequency transmission system of claim 1 wherein the delay stage comprises:

an input buffer for receiving the carrier wave; and an output buffer for transmitting the carrier wave with a delay.

4. The radio frequency transmission system of claim 1 wherein the delay stage comprises a programmable delay for delaying the carrier wave by a variable delay amount.

5. The radio frequency transmission system of claim 4, wherein the programmable delay is configured for manual adjustment to establish the delay amount.

6. The radio frequency transmission system of claim 4 further comprising a processor in electrical communication with the programmable delay to enable adjustment of the delay amount by the processor.

7. The radio frequency transmission system of claim 6 further comprising a user interface in electrical communication with the processor.

8. The radio frequency transmission system of claim 7 further comprising:

an antenna in electrical communication with the modulator and configured to broadcast the amplitude modulated carrier wave; and an antenna feedback in electrical communication with the antenna and the processor to provide feedback relating to the broadcast signal.

9. The radio frequency transmission system of claim 4, wherein the programmable delay includes, a plurality of switches coupled in series, and a plurality of delay components coupled to the switches, the switches and delay components configured to provide a variable delay amount through operation of the switches.

10. A method for transmitting radio frequency energy and incorporating an envelope delay within a broadcast signal to achieve a directional pattern, the method comprising:

generating a carrier wave;

delaying the carrier wave by a delay amount;

receiving analog audio;

modulating the carrier wave with the analog audio to produce an amplitude modulated carrier wave with an envelope delay.

11. The method of claim 10 further comprising amplifying the power of the amplitude modulated carrier wave.

12. The method of claim 10 wherein delaying the carrier wave is performed by a programmable delay that provides a variable delay amount.

13. The method of claim 12 further comprising manually adjusting the programmable delay to set a delay amount.

14. The method of claim 12 further comprising:

coupling the programmable delay to a processor; and the processor adjusting the programmable delay to set a delay amount.

15. The method of claim 14 further comprising coupling the processor to a user interface to enable user adjustment of the delay amount.

16. The method of claim 10 further comprising:

transmitting the amplitude modulated carrier wave to provide the broadcast signal; and providing feedback relating to the broadcast signal.

17. The method of claim 12, wherein the programmable delay includes,
   a plurality of switches coupled in series, and
   a plurality of delay components coupled to the switches, the switches and delay components configured to provide a variable delay amount through operation of the switches.

18. A radio frequency transmission system incorporating an envelope within a broadcast signal to achieve a directional pattern, the system comprising:
   an oscillator configured to provide a carrier wave;
   a programmable delay stage in electrical communication with the oscillator to receive the carrier wave, the programmable delay stage configured to delay the carrier wave by a delay amount;
   a modulator in electrical communication with the delay stage and configured to provide amplitude modulation of the carrier wave with analog audio to thereby generate an amplitude modulated carrier wave with an envelope delay;
   an amplifier in electrical communication with the modulator and configured to amplify the power of the amplitude modulated carrier wave; and
   a processor in electrical communication with the delay stage, the oscillator, and the amplifier and configured to enable adjustment of the carrier wave, the delay amount, and power amplification.

* * * * *

UNITED STATES PATENT AND TRADEMARK OFFICE
CERTIFICATE OF CORRECTION

| | |
|---|---|
| PATENT NO. | : 6,920,186 B2 |
| APPLICATION NO. | : 09/990403 |
| DATED | : July 19, 2005 |
| INVENTOR(S) | : Mario Hieb |

It is certified that error appears in the above-identified patent and that said Letters Patent is hereby corrected as shown below:

Column 1, Line 5 reads, ". . . is a continuation in-part of . . ." which should read --. . . is a continuation-in-part of . . .--

Column 1, Lines 23-24 reads, ". . . can be found world wide." which should read --. . . can be found worldwide.--

Column 2, Line 52 reads, ". . . transmitted to digital-to analog converters . . ." which should read --. . . transmitted to digital-to-analog converters . . .--

Column 3, Lines 3-4 reads, ". . . are not power dependent." which should read --. . . are not power-dependent.--

Column 3, Line 13 reads, ". . . are obtained and be . . ." which should read --. . . are obtained can be . . .--

Column 4, Line 10 reads, ". . . with two antennas tuning units . . ." which should read --. . . with two antenna tuning . . .--

Column 4, Line 42 reads, ". . . audio input/(AID) converter . . ." which should read --. . . audio input/(A/D) converter . . .--

Column 6, Lines 23-24 reads, ". . . by adjusting envelop delay . . ." which should read --. . . by adjusting envelope delay . . .--

Column 7, Line 51 reads, ". . . toggle or dip switches . . ." which should read --. . . toggle or DIP switches . . .--

Column 8, Line 31 reads, ". . . by adjusting envelop delay and power . . ." which should read --. . . by adjusting envelope delay and power . . .--

Column 8, Line 50 reads, ". . . toggle or dip switches . . ." which should read --. . . toggle or DIP switches . . .--

Column 9, Line 67 reads, ". . . wave with an envelop delay." which should read --. . . wave with an envelope delay.---

UNITED STATES PATENT AND TRADEMARK OFFICE
CERTIFICATE OF CORRECTION

PATENT NO. : 6,920,186 B2
APPLICATION NO. : 09/990403
DATED : July 19, 2005
INVENTOR(S) : Mario Hieb It is certified that error appears in the above-identified patent and that said Letters Patent is hereby corrected as shown below:

Column 10, Line 15 reads, ". . . delay is configured for . . ." which should read --. . . delay is configurable for . . .--

Signed and Sealed this

Twelfth Day of August, 2008

JON W. DUDAS
*Director of the United States Patent and Trademark Office*